(12) United States Patent
Lawrence et al.

(10) Patent No.: US 8,079,050 B2
(45) Date of Patent: Dec. 13, 2011

(54) SYSTEM AND METHOD FOR PERFORMING INITIAL SETUP OF A DEVICE VIA REMOTE CONTROL

(75) Inventors: Thomas David Lawrence, Mission Viejo, CA (US); William C. Russell, Laguna Hills, CA (US); Lee Farrell, Orange, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 627 days.

(21) Appl. No.: 11/959,798

(22) Filed: Dec. 19, 2007

(65) Prior Publication Data

US 2009/0165060 A1    Jun. 25, 2009

(51) Int. Cl.
    *H04N 7/18*    (2006.01)
(52) U.S. Cl. .................................................. 725/81
(58) Field of Classification Search .............. 725/151, 725/80–81; 714/45; 348/725; 340/12.22, 340/12.29
    See application file for complete search history.

(56) References Cited

U.S. PATENT DOCUMENTS

| | | | |
|---|---|---|---|
| 6,732,195 B1 | 5/2004 | Baldwin | |
| 6,802,032 B1* | 10/2004 | Budinger et al. | 714/46 |
| 7,043,691 B1* | 5/2006 | Kwon et al. | 715/705 |
| 7,609,837 B2* | 10/2009 | Bennett | 380/262 |
| 2004/0019691 A1* | 1/2004 | Daymond et al. | 709/231 |
| 2005/0160468 A1* | 7/2005 | Rodriguez et al. | 725/109 |
| 2005/0283285 A1 | 12/2005 | Ying | |
| 2006/0174034 A1 | 8/2006 | Shand et al. | |
| 2007/0113254 A1* | 5/2007 | Noiri et al. | 725/105 |
| 2008/0225184 A1* | 9/2008 | Hardacker et al. | 348/734 |

\* cited by examiner

*Primary Examiner* — Andrew Koenig
*Assistant Examiner* — Alfonso Castro

(57) ABSTRACT

A method for configuring a device using a remote control, includes transmitting a signal from the remote control to a configuration proxy requesting configuration status of the device; waiting for a predetermined period of time for a response from the configuration proxy to the remote control; obtaining help information based on the response received at the remote control from the configuration proxy; and displaying the help information on a display.

14 Claims, 9 Drawing Sheets

SYSTEM AND METHOD FOR PERFORMING INITIAL SETUP OF A DEVICE VIA REMOTE CONTROL

BACKGROUND OF THE INVENTION

1. Field of the Invention

The present invention relates generally to set up of devices, and more particularly to a system and method for performing setup of a system using a remote control for displaying configuration help.

2. Description of the Related Art

A typical configuration of a television set includes connecting the television to an external device, such as a set top box.

If the initial, out-of-box setup of a television set and set top box type device fails, nothing is likely to be displayed on the television that might assist recovery. The problem is further exacerbated by the fact that the user is not sure whether the problem is in the television set, in the set top box type device or in the connection between the television and the set top box device.

In current systems, at the very least, the devices must be cabled together correctly before anything meaningful can be displayed at the television.

Typically, the initial purchaser of the set top box device and the television receive manuals for the devices. However, the typical user does not want to look at a manual. Even those users who are willing to take the time to look at a manual to try to determine and correct the problem may not be able to figure out how to correct the problem and will likely become frustrated. This is particularly true if the user is not even sure if the problem is in the television set, the set top box type device or the connection between the devices.

Thus, there is a need for a system and method for providing easy to use help for performing initial set up of a device, such as a television, coupled to an external device such as a set top box.

SUMMARY OF THE INVENTION

The present invention provides a system and method for providing easy to use help for performing initial set up of a device, such as a television, coupled to an external device such as a set top box.

The help may be provided on the display of a remote control device. In particular, if the initial setup is not capable of displaying anything on the device, such as the television, help will be displayed on the display of the remote control.

In accordance with an aspect of the present invention a method for configuring a device using a remote control includes: transmitting a signal to a configuration proxy requesting configuration status of the device; setting a timeout period for waiting for a response from the configuration proxy; waiting for the first to occur of receiving a status response from the configuration proxy or waiting for the timeout period; obtaining help information based on the response received from the configuration proxy or lack of response received prior to passage of the timeout period; and displaying the help information on a display.

In accordance with another aspect of the invention, a remote control for configuring a device includes: a memory having help information for a device stored therein; a communication port for communication with a configuration proxy in order to obtain configuration status of the device; and a display device on which help information obtained from the memory based on the configuration status of the device is displayed.

In accordance with another aspect of the present invention, a media extender includes: a device communication port for communicating with a device regarding configuration status of the device; and a remote control communication port for transmitting the configuration status of the device to a remote control for retrieval and display of help information based on the configuration status of the device.

In accordance with another aspect of the invention, a device includes a communication port for receiving a configuration status request from a remote control via a configuration proxy and providing a configuration status response to the remote control via the configuration proxy.

Further features of the present invention will become apparent from the following description of exemplary embodiments with reference to the accompanying drawings.

DETAILED DESCRIPTION OF THE EMBODIMENTS

According to exemplary embodiments of the present invention, easy to use help is provided for performing initial set up of a device, such as a television, coupled to an external device such as a media extender.

The help may be provided on the display of a remote control device. In particular, if the initial setup is not capable of displaying anything on the device, such as the television, help will be displayed on the display of the remote control.

In the exemplary embodiments described herein, the device is a display device, such as a television. It will be appreciated that the device need not be a television or even a display device. The device can be any device that can communicate with an external device, such as a remote control type device for displaying configuration help.

Figure 1:
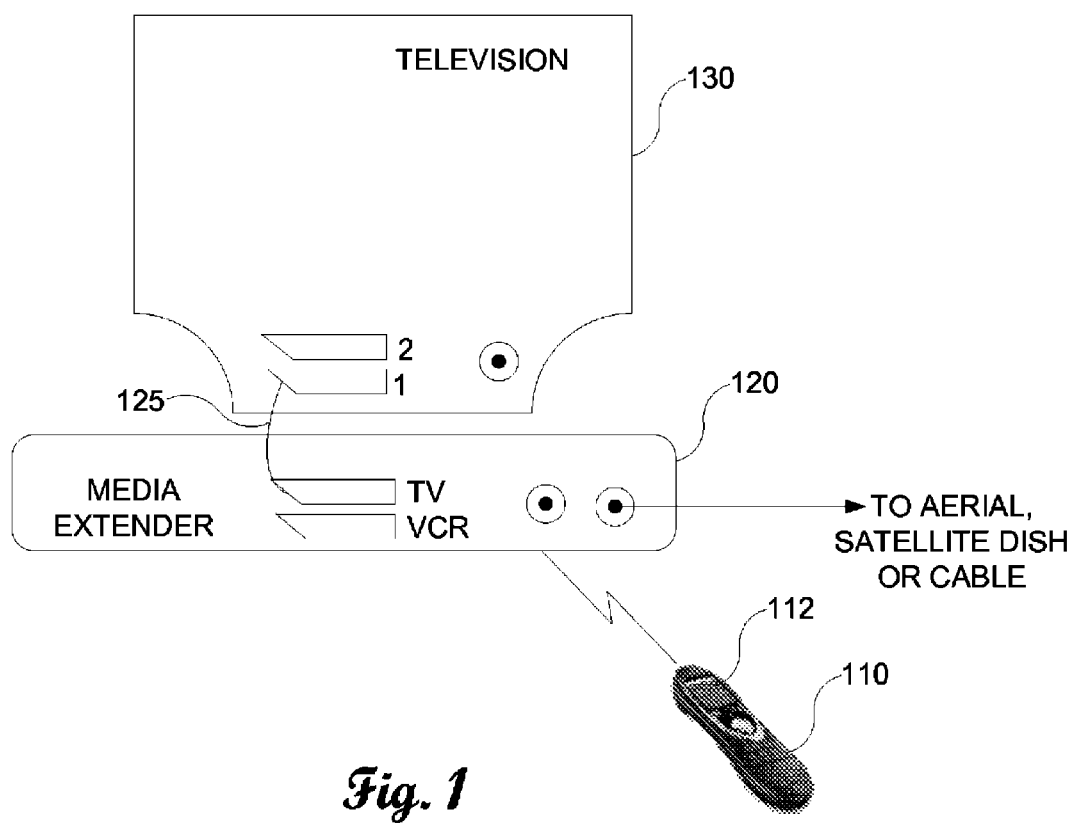
FIG. 1 illustrates an exemplary configuration of system including a device (e.g., display device, such as a television), a media extender and a remote control.

FIG. 1 illustrates an exemplary configuration of a system including a device (a television in the example shown) 130, in communication with a media extender 120 and a remote control 110.

The remote control 110 sends signals wirelessly to either the television 130 and/or the media extender 120, for example, to change channels and adjust volume. As described further later, in the present invention, the remote control 110 also sends signals requesting configuration information and receives signals including configuration status responses.

The remote control 110 includes a display portion 112. Configuration help may be displayed on the remote control display 112. In exemplary embodiments, the remote control display 112 is a touch screen display. It will be appreciated that in some embodiments the remote control display 112 is not a touch screen display and the user enters inputs by pressing buttons on the remote control 110. It will also be appreciated that with a touch screen remote control, the user may enter inputs using buttons in addition to or instead of pressing the display 112 on the remote control.

In the exemplary display system shown in FIG. 1 the television 130 is connected to the media extender 120. The media extender 120 includes a port for receiving signals from an external source, such as an aerial, a satellite dish or cable. The television 130 is connected to and receives signals from the media extender 120, for example via a cable 125 which is connected to the media extender port. In addition to conventional signals, e.g., audio and video, the media extender 120 of the present invention may send configuration status request signals to the television 130. In exemplary embodiments, such information is transmitted using the same transmission connection as the conventional signals. In response to the configuration status request, the media extender 120 receives status information (if the television 130 and media extender 120 are properly connected) which may include help display information from the television 130. The media extender 120 forwards the response information to the requester of the information, e.g., the remote control 110.

After the user connects the television 130 to the media extender 120 and powers on the television 130 and the media extender 120, the user expects to see video on the display of the television and to hear audio. If that does not happen, the user needs to take steps to remedy the problem. The present invention assists the user in easily remedying such problems.

In the exemplary embodiments shown in the figures and described herein, a configuration proxy determines configuration status and transmits the configuration status on request. In the example shown in FIG. 1, the configuration proxy can reside in the media extender. It will be appreciated that a configuration proxy can also reside in the television 130.

Figure 4:
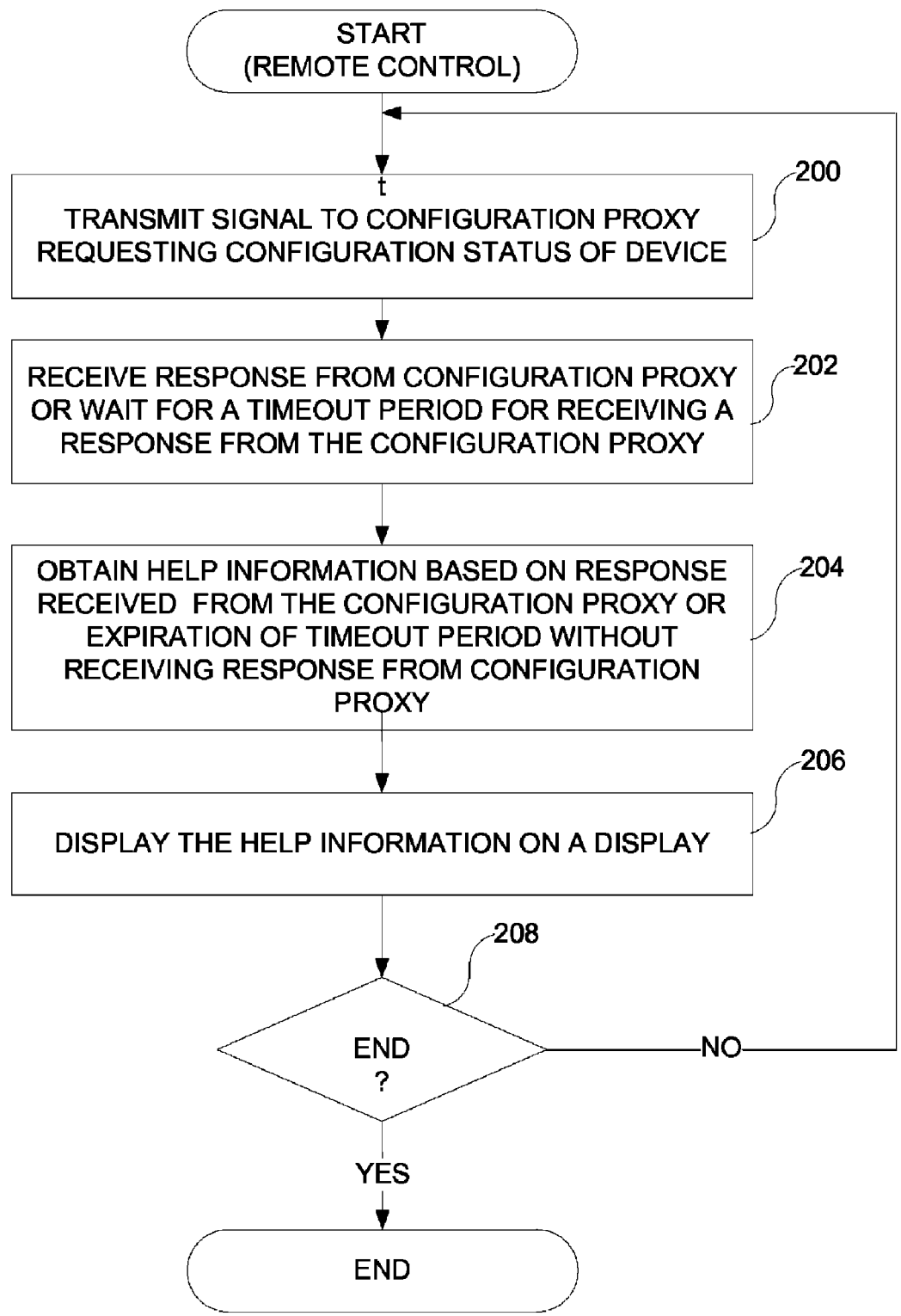
FIG. 4 is a data flow diagram illustrating providing help for configuration of a system, such as the display system shown in FIG. 1, FIG. 2 or FIG. 3.

FIG. 4 is a data flow diagram that illustrates providing help for configuration of a system, such as the one shown in FIG. 1.

The processing shown in FIG. 4 may be executed, for example, by pressing a button, such as a help button on the remote control 110. It will be appreciated that additional or alternative methods for starting the processing shown in FIG. 4 may be used.

Upon starting the help configuration process shown in FIG. 4, in step 200, a signal is transmitted from the remote control 110 to a configuration proxy requesting configuration status. As described above, the configuration proxy may be located in the media extender 120. The television 130 may also include a configuration proxy.

Next, in step 202, the remote control 110 waits for a response from the configuration proxy. After a response has been received from the configuration proxy or after waiting for a predetermined timeout period without receiving a response, help information is obtained based on the response or expiration of the timeout period, in step 204.

Figure 5:
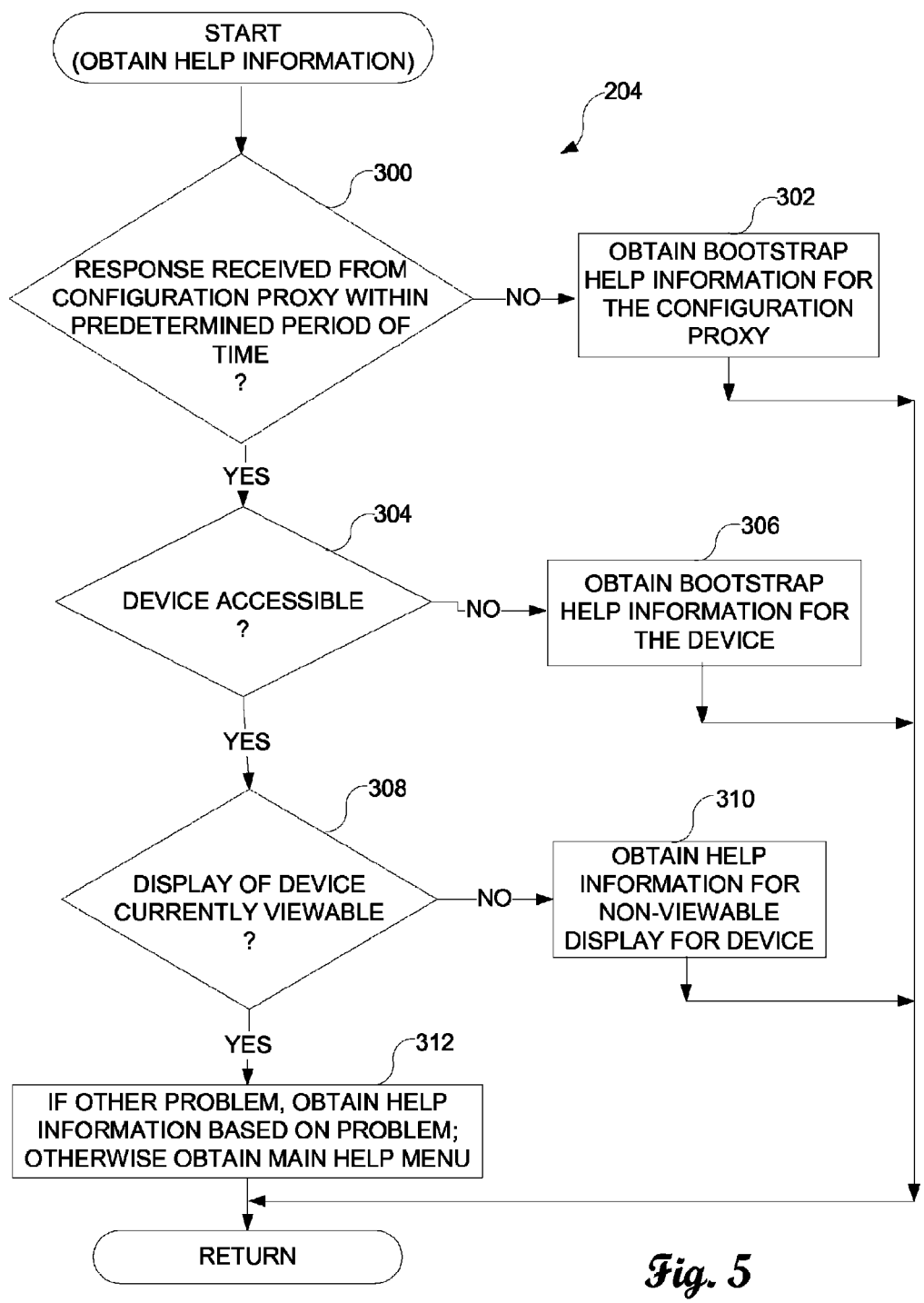
FIG. 5 is a data flow diagram illustrating details of obtaining help for configuration of a system, such as the display system shown in FIG. 1, FIG. 2 or FIG. 3.

FIG. 5 illustrates details of obtaining help information in step 204. First, in step 300, it is determined whether a response was received from the configuration proxy before expiration of the timeout period. If it is determined that a response was not received and that a timeout occurred due to waiting for the predetermined time period (NO in step 300), bootstrap information for the configuration proxy is obtained.

Figure 7:
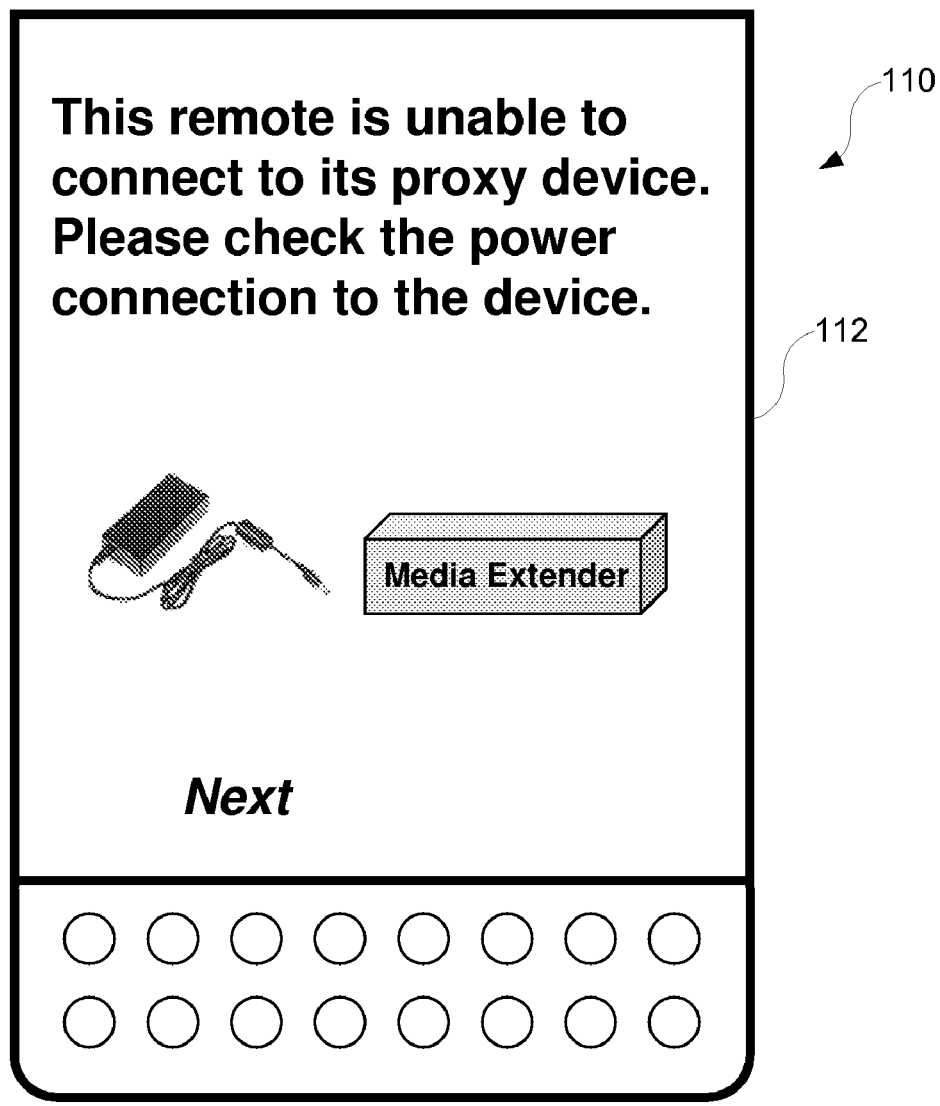
FIGS. 7-9 illustrate exemplary help displays for configuring a system, such as the display system shown in FIG. 1, FIG. 2 or FIG. 3.

In this situation, the remote control 110 needs to obtain configuration help from a source other than the media extender 120 or the television 130. In exemplary embodiments, this information is stored in the remote control 110. In other embodiments, the remote control 110 may be able to obtain information from another source, for example, from a computer. The computer may obtain the information from another source, for example, via the Internet. An example of help obtained when a timeout has occurred is shown in FIG. 7. Processing then returns to FIG. 4.

If it is determined that a response was received from the configuration proxy prior to the expiration of the predetermined period of time (YES in step 300), it is determined in step 304 whether the television 130 is accessible. If it is determined that the television 130 is not accessible (NO in step 304), bootstrap information for the television 130 is obtained in step 306.

Figure 8:
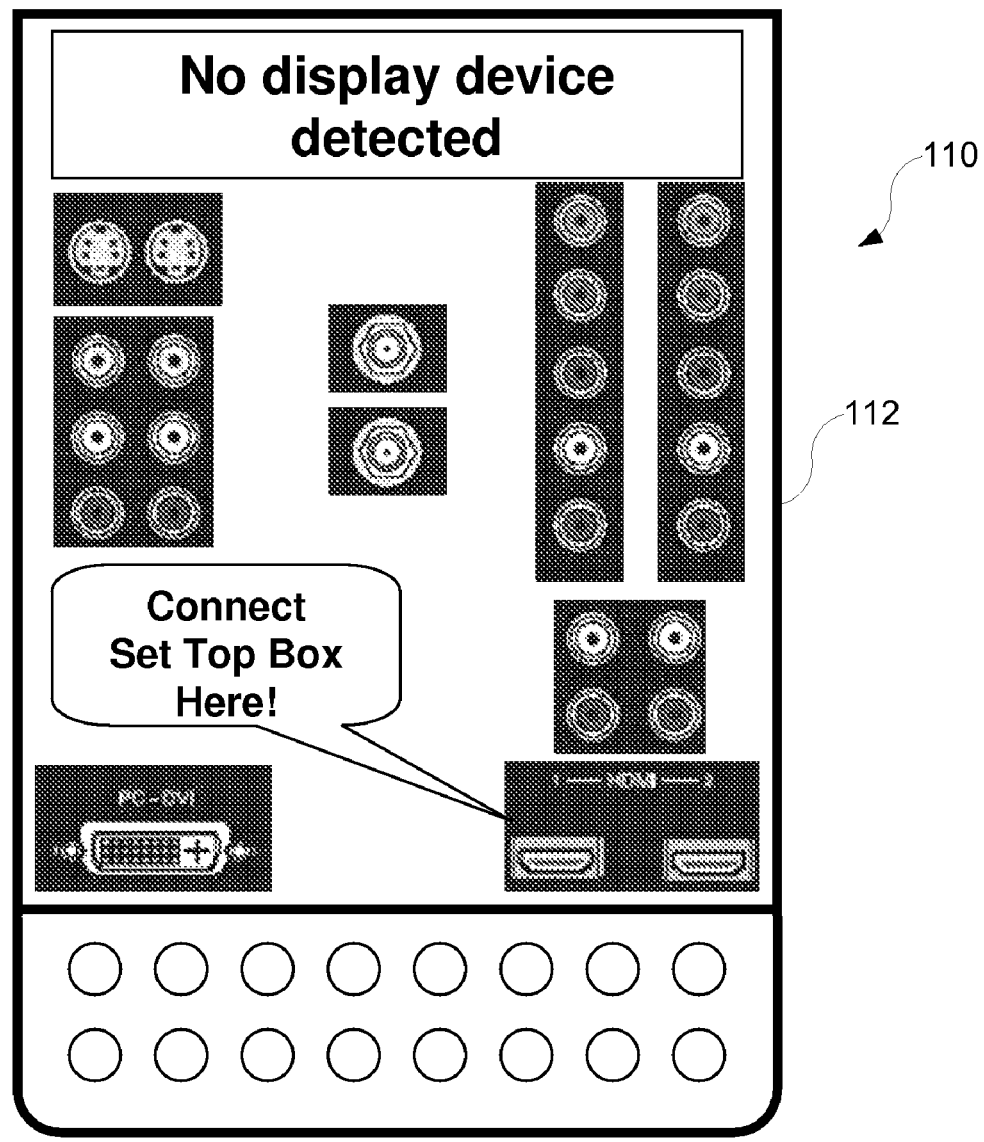

In this situation, since the remote control 110 received a response from the media extender 120, it is possible that help information may be obtained from the configuration proxy in the media extender 120. Additionally, as in the case described above in which the remote control 110 can not communicate with the configuration proxy, the configuration help may be stored in the remote control 110 and/or may be obtained from an external source. As described above, in exemplary embodiments, the information may be obtained via the Internet using a computer. In other embodiments, such as that shown in FIG. 3, the media extender 120 may receive configuration help information from an external source, for example, via the Internet 150. An example of configuration help obtained when the television 130 is not accessible is shown in FIG. 8. Processing then returns to FIG. 4.

If it is determined that the television 130 is accessible (YES in step 304), it is determined whether video signals are being displayed on the television 130 in step 308. If it is determined in step 308 that the television display is not working (NO in step 308), help information for a non-viewable display is obtained in step 310.

In this situation, since the remote control 110 received a response from the media extender 120, and the television 130 is accessible, it is possible that help information may be stored in the remote control 110, or obtained from the media extender 120. The help information that is sent from the media extender 120 to the remote control 110 may be stored in the media extender 120, in the television 130 or obtained from an external source, for example, via the Internet 150. Processing then returns to FIG. 4.

Figure 9:
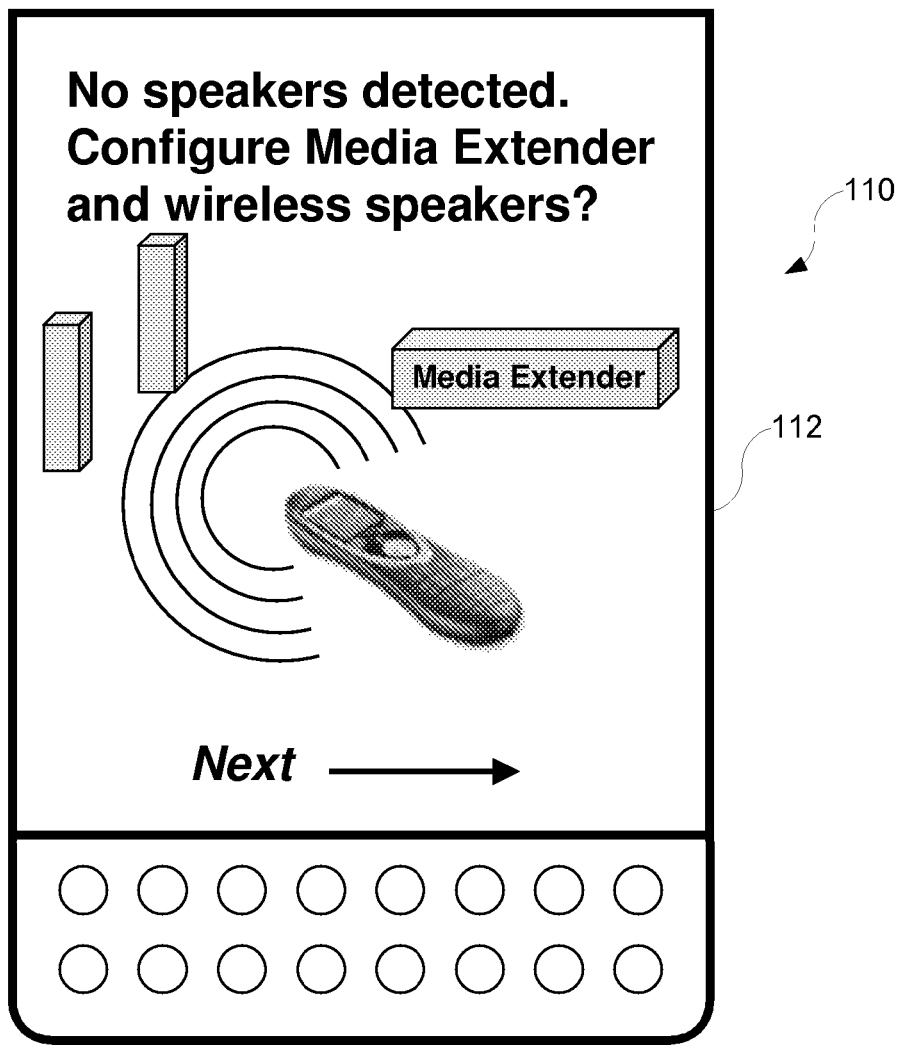

If it is determined in step 308 that video signals are being displayed on the television 130 (YES in step 308), other help is obtained based on the response received from the configuration proxy. For example, if the status response from the configuration proxy indicates that there is a problem with the audio, configuration help, such as that shown in FIG. 9, is obtained. In exemplary embodiments, if no problem is detected, a main help menu will be displayed.

Returning to FIG. 4, after obtaining help information in step 204 (i.e., step 302, 306, 310 or 312 in FIG. 5), the help information is displayed in step 206. Exemplary displays of help information are shown in FIGS. 7-9.

Figure 6:
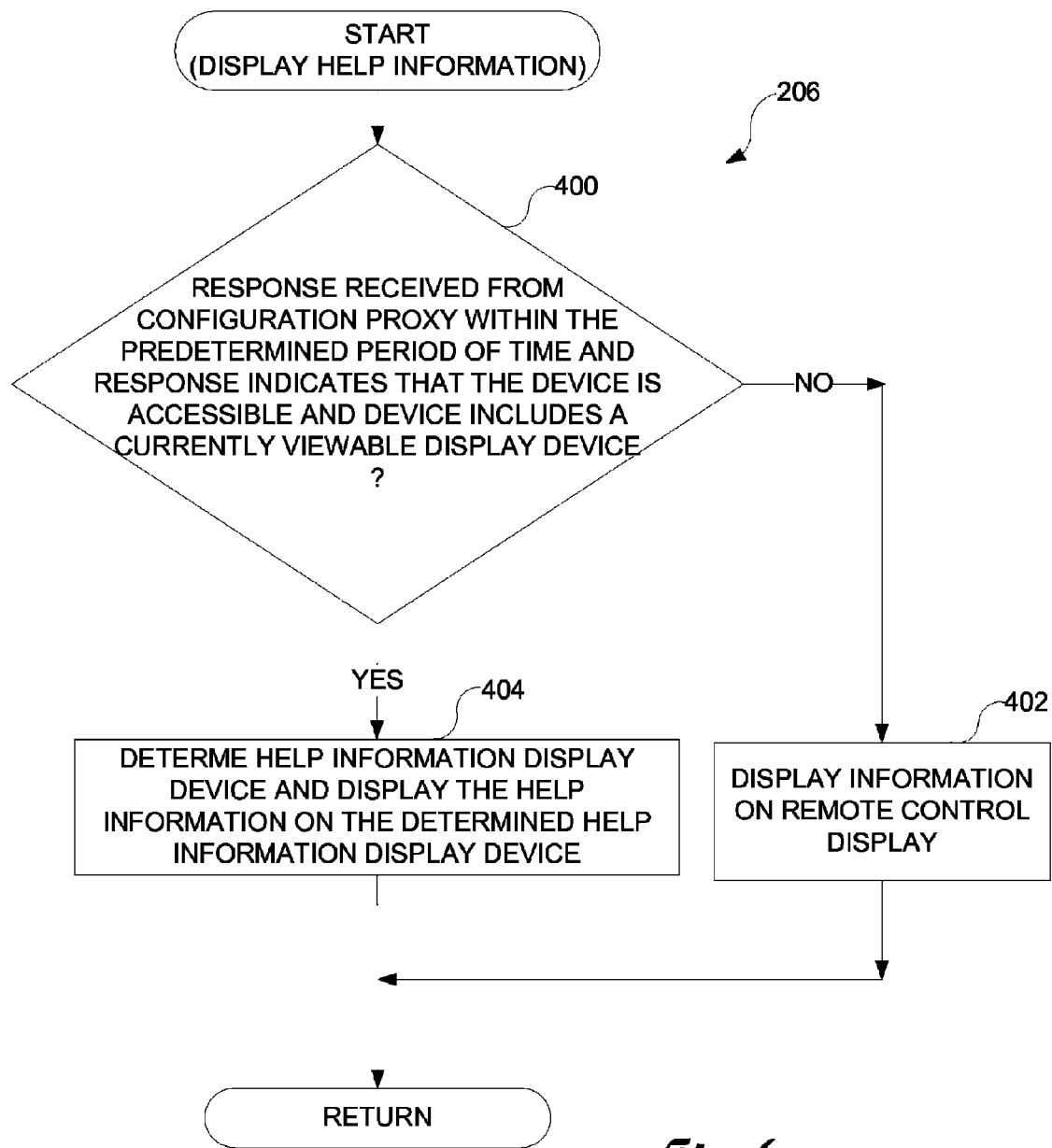
FIG. 6 is a data flow diagram illustrating details of displaying help information for configuration of a system, such as the display system shown in FIG. 1, FIG. 2 or FIG. 3.

FIG. 6 is a data flow diagram illustrating details of displaying help information (step 206). In step 400 of FIG. 6, if it is determined that a response was received in the predetermined amount of time (YES in step 300 of FIG. 5), the device 130 is accessible (YES in step 304 of FIG. 5) and a display portion of the device 130 is operational (YES in step 308 of FIG. 5), in step 404, it is determined where to display the help information (obtained in step 312 of FIG. 5) and the help information is displayed on the determined display device. For example, the information may be displayed on the display 112 of the remote control 110 and/or on the device display, e.g., television screen. In exemplary embodiments, the default display device will default to the device display. However, in exemplary embodiments this may be overridden. For example, the user may be behind the television 130 and not be able to see the display of the television 130. In such a case, the user would want to view the help information on the remote control display 112. After determining the display device and displaying the help information on the display device (step 404), processing returns to FIG. 4

In step 400 of FIG. 6, if it is determined that a response was not received in the predetermined amount of time (NO in step 300 of FIG. 5), or the device is not accessible (NO in step 304 of FIG. 5) or the device display is not working (NO in step 308 of FIG. 5), in step 402, the information obtained (in step 302, 306 or 310 of FIG. 4) is displayed on the remote control display 112. Processing then returns to FIG. 4.

Returning to FIG. 4, after the help information is displayed, it is determined in step 208 whether the help process shown in FIG. 4 should end, for example, by the user pressing an exit key on the remote control 110. If it is determined that the help processing should end (YES in step 208), processing ends and the remote control exits the help mode and returns to normal processing of the remote control, e.g., waiting for the user to press a key. On the other hand, if it is determined that help processing has not ended, processing returns to step 200.

Figure 2:
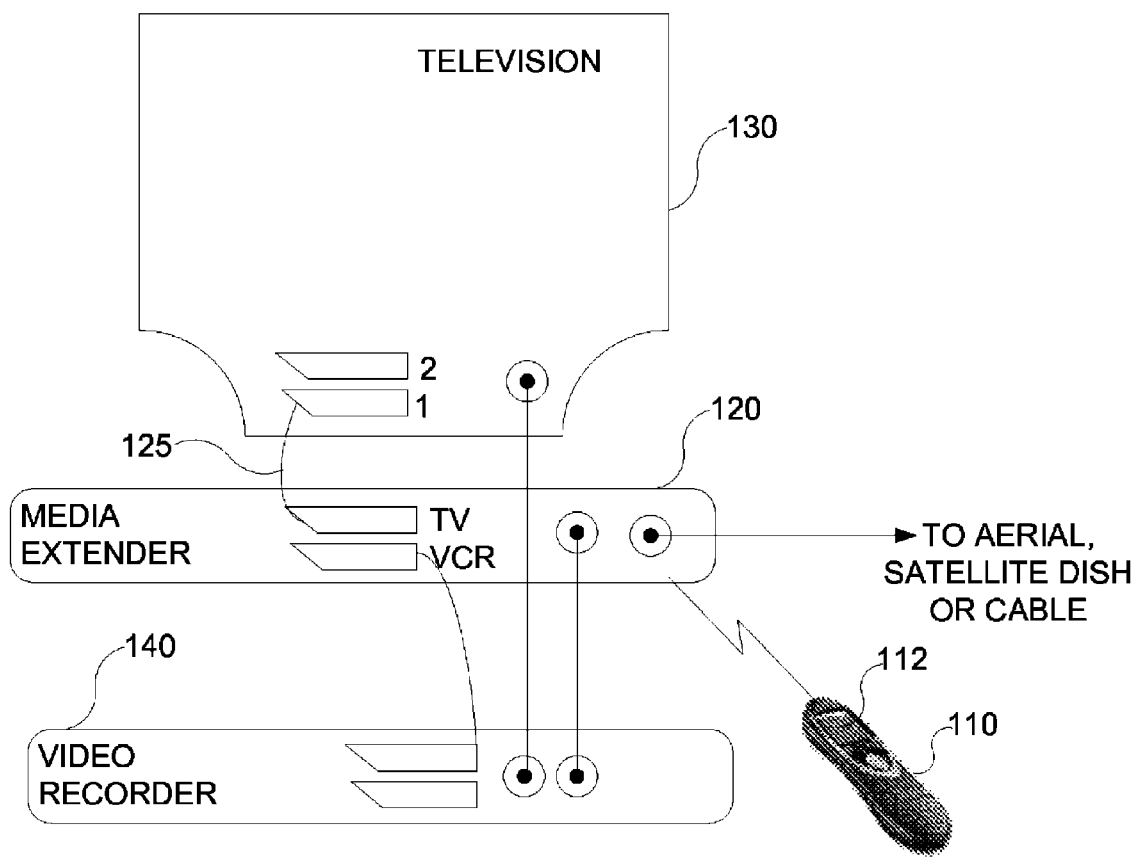
FIG. 2 illustrates another exemplary configuration of a system such as that of FIG. 1 with additional components, such as a receiver and/or digital versatile disc (DVD) player and/or recorder.
Figure 3:
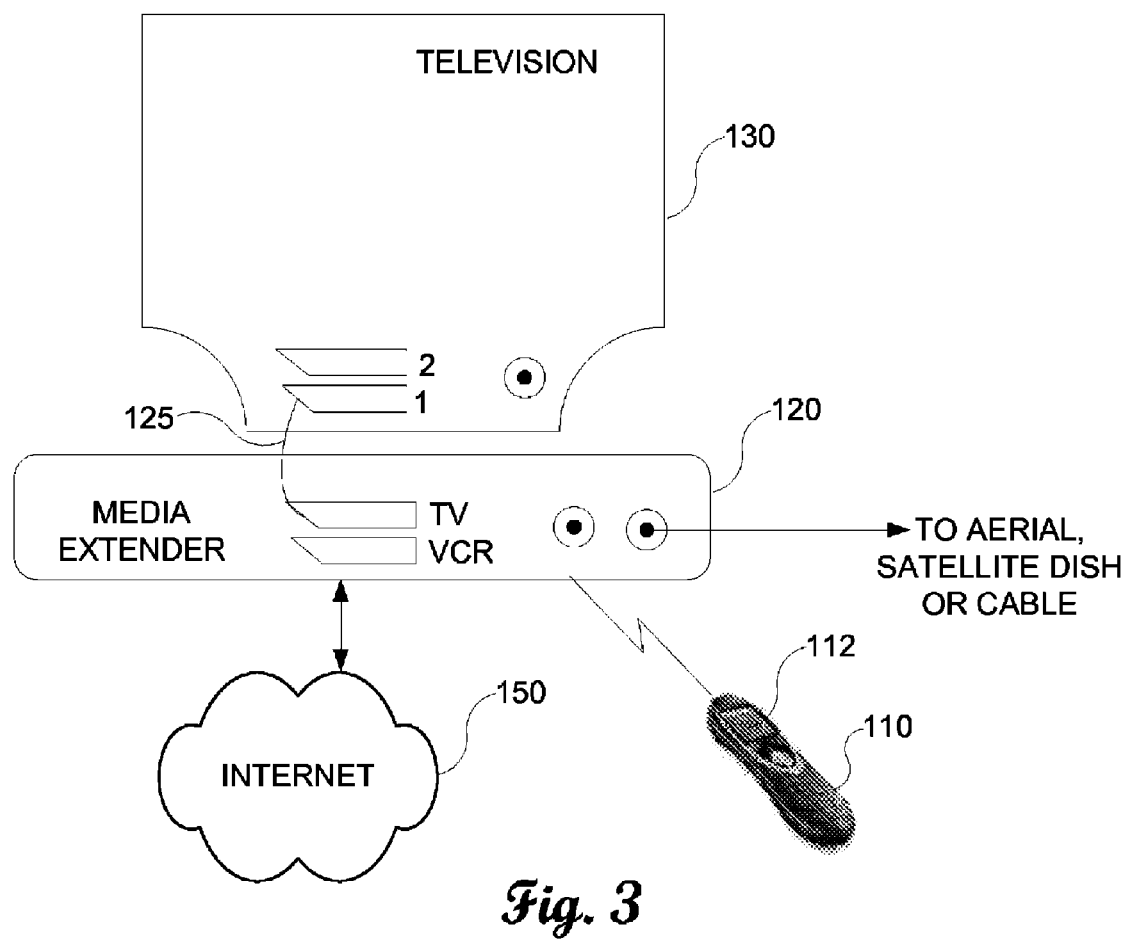
FIG. 3 illustrates another exemplary configuration of a display system such as that of FIG. 1 with communications with an external source, for example, via the Internet.

The exemplary configuration shown in FIG. 1 and described above is a simplistic example showing a minimal amount of components. It will be appreciated that various other components can be included, for example one or a combination of a receiver, a DVD player/recorder, a compact disc (CD) player/recorder, a video game console or a computer. FIG. 2 illustrates an example which includes a video recorder 140 in addition to the components shown in FIG. 1. Additionally, as described above, help information may be received from an external source, e.g., via the Internet 150. Such information may be obtained by a computer (not shown) or by the media extender 120 as shown in FIG. 3.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A method for configuring a display device using a remote control, the method comprising steps of:
   transmitting a signal to a configuration proxy requesting configuration status of the display device;
   setting a timeout period for waiting for a configuration status response from the configuration proxy;
   waiting for the first to occur of receiving the configuration status response from the configuration proxy or waiting for the timeout period;
   determining whether the configuration status response is received from the configuration proxy within the predetermined period of time and the configuration status response indicates that the display device is accessible and the display device includes a currently viewable display unit;
   obtaining help information based on the configuration status response received from the configuration proxy or lack of receiving the configuration status response prior to passage of the timeout period, wherein the obtaining step obtains the help information based on contents of the configuration status response when the determining step determined that the configuration status response is received from the configuration proxy within the predetermined period of time and the configuration status response indicates that the display device is accessible and the display device includes a currently viewable display unit, and wherein the obtaining step obtains the help information that indicates that the display device does not include a currently viewable display unit when the determining step determined that the configuration status response is received from the configuration proxy within the predetermined period of time and the configuration status response indicates that the display device is accessible but the display device does not include a currently viewable display unit; and
   displaying the help information based on the contents of the configuration status response on the display unit of the display device when the determining step determined that the configuration status response is received from the configuration proxy within the predetermined period of time and the configuration status response indicates that the display device is accessible and the display device includes a currently viewable display unit, and displaying the help information that indicates that the display device does not include a currently viewable display unit on a display unit of the remote control when the determining step determined that the configuration status response is received from the configuration proxy within the predetermined period of time and the configuration status response indicates that the display device is accessible but the display device does not include a currently viewable display unit.

2. The method according to claim 1, wherein if the configuration status response is not received from the configuration proxy prior to passage of the timeout period,
   obtaining the help information comprises obtaining bootstrap help information for the configuration proxy; and
   displaying the help information comprises displaying the bootstrap help information for the configuration proxy on the display unit of the remote control.

3. The method according to claim 1, wherein if the configuration status response is received from the configuration proxy and the configuration status response indicates that the display device is not accessible,
   obtaining the help information comprises obtaining bootstrap help information for the device; and
   displaying the help information comprises displaying the bootstrap help information for the device on the display unit of the remote control.

4. The method according to claim 3, wherein the bootstrap information for the display device is stored in the remote control.

5. The method according to claim 3, wherein the bootstrap information for the display device is obtained by the remote control from a source external to the remote control.

6. The method of claim 1, wherein the display device includes the configuration proxy.

7. The method of claim 1, wherein a media extender, external to the display device, includes the configuration proxy.

8. The method of claim 1, wherein the display device is a television.

9. The method of claim 1, further comprising receiving user input via a touch screen on the remote control.

10. A remote control for configuring a device, the remote control comprising:

a memory having help information for a display device stored therein;

a communication port for communication with a configuration proxy in order to obtain configuration status of the display device;

a display unit on which help information obtained from the memory based on the configuration status of the display device is displayed; and a control unit which transmits a signal to the configuration proxy requesting configuration status of the display device, and sets a timeout period for waiting for a configuration status response from the configuration proxy, and waits for the first to occur of receiving the configuration status response from the configuration proxy or waiting for the timeout period, and determines whether the configuration status response is received from the configuration proxy within the predetermined period of time and the configuration status response indicates that the display device is accessible and the display device includes a currently viewable display unit, wherein the control unit obtains help information based on the configuration status response received from the configuration proxy or lack of receiving the configuration status response prior to passage of the timeout period, the control unit obtaining the help information based on contents of the configuration status response when it is determined that that the configuration status response is received from the configuration proxy within the predetermined period of time and the configuration status response indicates that the display device is accessible and the display device includes a currently viewable display unit, and obtaining the help information that indicates that the display device does not include a currently viewable display unit when it is determined that the configuration status response is received from the configuration proxy within the predetermined period of time and the configuration status response indicates that the display device is accessible but the display device does not include a currently viewable display unit, and wherein the control unit controls to display the help information based on the contents of the configuration status response on the display unit of the display device when it is determined that the configuration status response is received from the configuration proxy within the predetermined period of time and the configuration status response indicates that the display device is accessible and the display device includes a currently viewable display unit, and controls to display the help information that indicates that the display device does not include a currently viewable display unit on a display unit of the remote control when it is determined that the configuration status response is received from the configuration proxy within the predetermined period of time and the configuration status response indicates that the display device is accessible but the display device does not include a currently viewable display unit.

11. The remote control of claim 10, wherein the configuration proxy is included in a media extender.

12. The remote control of claim 10, wherein the configuration proxy is included in a television.

13. The remote control of claim 10, wherein the memory has help information for a plurality of display devices stored therein.

14. The remote control of claim 10, wherein the display unit is a touch screen display and user inputs are received based on a location touched by a user on the display unit on which the help information is displayed.

* * * * *